United States Patent
Grossmann et al.

(10) Patent No.: US 6,436,174 B1
(45) Date of Patent: Aug. 20, 2002

(54) METHOD FOR REMOVING ACID GAS COMPONENTS FROM GASES

(75) Inventors: Christoph Grossmann, Limburgerhof; Karl-Heinz Hänzel, Kirrweiler; Dieter Kolassa, Limburgerhof; Norbert Asprion, Mannheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/720,783

(22) PCT Filed: Jun. 23, 1999

(86) PCT No.: PCT/EP99/04366
§ 371 (c)(1),
(2), (4) Date: Dec. 29, 2000

(87) PCT Pub. No.: WO00/00271
PCT Pub. Date: Jan. 6, 2000

(30) Foreign Application Priority Data

Jun. 29, 1998 (DE) .......................... 198 28 977

(51) Int. Cl.[7] .............................. B01D 53/14
(52) U.S. Cl. .................. 95/191; 95/235; 95/236; 423/226
(58) Field of Search ............. 95/191, 159, 230, 95/235, 236, 237; 423/220, 226

(56) References Cited

U.S. PATENT DOCUMENTS

| | | | |
|---|---|---|---|
| 4,094,957 A | * | 6/1978 | Sartori et al. |
| 4,100,257 A | * | 7/1978 | Sartori et al. |
| 4,217,238 A | * | 8/1980 | Sartori et al. |
| 4,336,233 A | * | 6/1982 | Appl et al. |
| 4,533,373 A | * | 8/1985 | Butz et al. |
| 4,551,158 A | * | 11/1985 | Wagner et al. |
| 4,553,984 A | * | 11/1985 | Volkamer et al. |
| 4,624,838 A | * | 11/1986 | Pan et al. |
| 4,814,104 A | * | 3/1989 | Kubek et al. |
| 4,999,031 A | * | 3/1991 | Gerhardt et al. |
| 5,209,914 A | * | 5/1993 | Peytavy et al. |
| 5,277,885 A | | 1/1994 | Peytavy et al. |
| 5,281,254 A | | 1/1994 | Birbara et al. |
| 5,480,860 A | | 1/1996 | Dillion |
| 5,618,506 A | * | 4/1997 | Suzuki et al. |
| 5,700,437 A | * | 12/1997 | Fuji et al. |
| 5,744,110 A | * | 4/1998 | Mimura et al. |
| 5,904,908 A | * | 5/1999 | Suzuki et al. |
| 6,036,931 A | * | 3/2000 | Yoshida et al. |
| 6,337,059 B1 | * | 1/2002 | Schubert et al. |

FOREIGN PATENT DOCUMENTS

| | | |
|---|---|---|
| DE | 25 51 717 | 6/1977 |
| DE | 28 04 418 | 8/1978 |
| EP | 0 705 637 | 4/1996 |

* cited by examiner

Primary Examiner—Duane S. Smith
(74) Attorney, Agent, or Firm—Oblon, Spivak, McClelland, Maier & Neustadt, P.C.

(57) ABSTRACT

A process for removing acidic gas constituents, of the group consisting of $CO_2$, $H_2S$, COS, $CS_2$ and mercaptans, from gases, in which, in an absorption step, a dirty gas rich in acidic gas constituents is brought into contact with an absorption medium, as a result of which a clean gas low in acidic gas constituents and an absorption medium laden with acidic gas constituents are obtained, the absorption medium used being a mixture comprising a) from 0.1 to 50% by weight of one or more mono-cyclic or bicyclic nitrogen heterocycles which are unsubstituted and/or monosubstituted or poly-substituted on the carbon by OH, $C_1$–$C_3$ alkyl and/or $C_1$–$C_3$ hydroxyalkyl and which have from 5 to 14 ring atoms and 1 or 2 heterocyclically bound nitrogen atoms per ring as component A, b) from 1 to 60% by weight of a monohydric and/or polyhydric alcohol as component B, c) from 0 to 60% by weight of an aliphatic aminoalcohol as component C, d) from 0 to 98.9% by weight of water as component D, e) from 0 to 35% by weight of $K_2CO_3$ as component E, where the sum of components A, B, C, D and E is 100% by weight.

15 Claims, 7 Drawing Sheets

METHOD FOR REMOVING ACID GAS COMPONENTS FROM GASES

Figure 1:
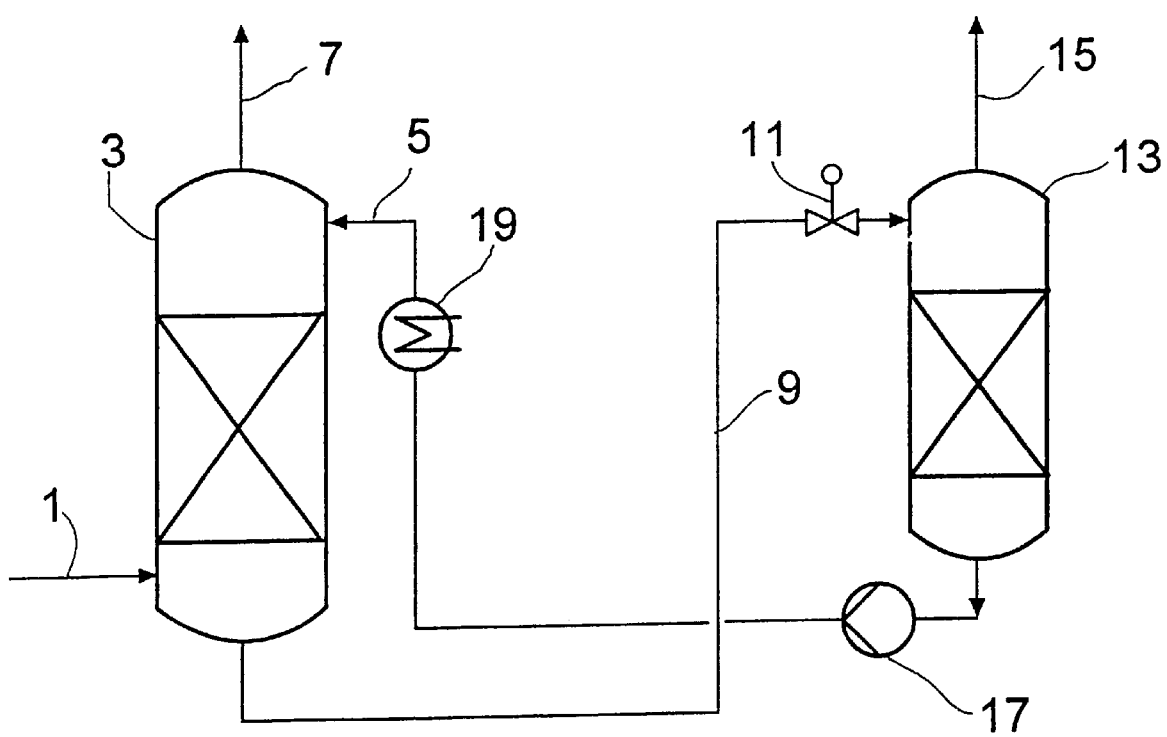

The invention relates to a process for removing acidic gas constituents such as $CO_2$ and $H_2S$ from gases using an absorption medium, to the absorption medium itself and to its use.

It is known to remove unwanted acidic gas constituents, such as $CO_2$, $H_2S$ or COS, from gases comprising these constituents by gas scrubbing using aqueous or nonaqueous mixtures of organic solvents as absorption medium. In this operation, both physical and chemical solvents are used. Known physical solvents are, for example, cyclotetramethylene sulfone, N-methyl-pyrrolidone and N-alkylated piperidones. Of the chemical solvents, those which have proved especially useful industrially are the aqueous solutions of primary, secondary and tertiary aliphatic amines or alkanolamines, such as monoethanolamine (MEA), diethanolamine (DEA), monomethylethanolamine (MMEA), diethylethanolamine (DEEA), triethanolamine (TEA), diisopropanolamine (DIPA) and methyldiethanolamine (MDEA). Amines act as bases, forming, in the presence of water, the corresponding ammonium carbonates or ammonium hydrogen carbonates with $CO_2$ and the corresponding ammonium sulfides or ammonium hydrogen sulfides with $H_2S$. Primary and secondary amines can, in addition, react with $CO_2$, forming carbamates.

To increase the absorption rate of the solvent mixtures for $CO_2$, $H_2S$ and COS, said aliphatic amines and alkanolamines are used with certain saturated nitrogen heterocycles, such as piperazine or morpholine. DE-A 25 51 717 describes a process for removing $CO_2$ and/or $H_2S$ and, if appropriate, COS from gases by scrubbing with absorption media which comprise piperazine and aliphatic alkanolamines in aqueous solution. According to the information in this publication, piperazine acts as an accelerator for the absorption. Therefore, piperazine, according to this teaching, is preferably used in catalytic amounts as absorption accelerator in aqueous solution together with physical or chemical solvents known per se or their mixtures. Said publication also discloses the use of piperazine in a mixture with physical solvents, such as methanol, N-methylpyrrolidone and polyethylene glycol dimethyl ether, in which case, because of the carbamate formation by the piperazine, only substantially dilute aqueous solutions can be used. Piperazine is therefore preferably used in aqueous solution with chemical solvents, preferably with tertiary aliphatic alkanolamines.

The known solvent mixtures have the disadvantage that piperazine in these mixtures principally influences the absorption rate of $CO_2$, but the solubility of piperazine in aqueous solutions of aliphatic alkanolamines, such as MDEA, is restricted.

It is an object of the present invention to provide a liquid absorption medium for removing acidic gas constituents from gases, which absorption medium, in addition to a high absorption rate, has a high capacity for acidic gas constituents.

We have found that this object is achieved by a process for removing acidic gas constituents, of the group consisting of $CO_2$, $H_2S$, COS, $CS_2$ and mercaptans, from gases, in which, in an absorption step, an untreated gas rich in acidic gas constituents is brought into contact with an absorption medium, as a result of which a clean gas low in acidic gas constituents and an absorption medium laden with acidic gas constituents are obtained, which process comprises using as absorption medium a mixture comprising a) from 0.1 to 50% by weight of one or more mono-cyclic or bicyclic nitrogen heterocycles which are unsubstituted and/or monosubstituted or polysubstituted on the carbon by OH, $C_1$–$C_3$ alkyl and/or $C_1$–$C_3$ hydroxyalkyl and which have from 5 to 14 ring atoms and 1 or 2 heterocyclically bound nitrogen atoms per ring as component A, b) from 1 to 60% by weight of a monohydric and/or polyhydric alcohol as component B, c) from 0 to 60% by weight of an aliphatic alkanolamine as component C, d) from 0 to 98.9% by weight of water as component D, e) from 0 to 35% by weight of $K_2CO_3$ as component E, where the sum of components A, B, C, D and E is 100% by weight.

We have found that the object is achieved, in addition, by a liquid absorption medium of the above specified composition.

Gases which comprise said acidic gas constituents are, for example, natural gases, synthesis gases, coke furnace gases, coal gasification gases and cycle gases in the production of ethylene oxide. These gases, in addition to one or more of said acidic gas constituents, comprise other inert gas constituents which are not absorbed to a significant extent by the liquid absorption medium. Examples are highly volatile hydrocarbons, preferably $C_1$–$C_4$ hydrocarbons and, particularly preferably, methane, and in addition nitrogen and hydrogen. The process of the invention is suitable, inter alia, for cleaning these gases by removing the acidic gas constituents. The gases to be cleaned can comprise $CO_2$, preferably in amounts up to 75% by volume, and $H_2S$, preferably in amounts of up to 50% by volume. Furthermore, the gases to be cleaned can comprise COS, preferably in amounts up to 5% by volume, $CS_2$, preferably in amounts up to 1% by volume, and mercaptans, preferably alkyl mercaptans, in particular methyl mercaptan, preferably in amounts up to 1% by volume. The process of the invention is particularly suitable for removing $CO_2$ and $H_2S$.

The absorption medium of the invention comprises as component A from 0.1 to 50% by weight, preferably from 5 to 30% by weight, particularly preferably from 8 to 25% by weight, of one or more monocyclic or bicyclic nitrogen heterocycles which are unsubstituted and/or monosubstituted or polysubstituted on the carbon by OH, $C_1$–$C_3$ alkyl and/or $C_1$–$C_3$ hydroxyalkyl and which have from 5 to 14 ring atoms and 1 or 2 heterocyclically bound nitrogen atoms per ring. Bicyclic heterocycles are those which have two anellated rings or two rings bound via a single bond. These are preferably bound via carbon atoms. The rings can have further heteroatoms, for example oxygen or sulfur. Examples are pyrrolidine, pyrazolidine, imidazolidine, piperidine, piperazine, hexahydropyrimidine, azepan, diazepan, octahydroindole, octahydrobenzimidazole, octahydropurine, decahydroquinoline, decahydroisoquinoline, decahydroquinazoline, decahydroquinoxaline, decahydropteridine, 2-[2-pyrrolidyl]pyrrolidine, 2-[2-imidazolidyl]imidazolidine, 3-[3-pyrrolidyl]-piperidine, 2-[3-pyrrolidyl]piperazine, 3-[3-piperidyl]piperidine, 3-[2-piperazinyl]-piperidine and 2-[2-piperazinyl]piperazine. Said heterocycles can be mono-substituted or polysubstituted by OH, methyl, ethyl, propyl, hydroxymethyl, hydroxyethyl and hydroxypropyl.

Preferably, the absorption medium of the invention comprises as component A unsubstituted piperazine and/or one or more piperazines monosubstituted or poly-substituted on the carbon by OH, $C_1$–$C_3$ alkyl and/or $C_1$–$C_3$ hydroxyalkyl. Particularly preferably, the absorption medium of the invention comprises as component A unsubstituted piperazine.

The liquid absorption medium comprises as component B from 1 to 60% by weight, preferably from 2 to 45% by weight, particularly preferably from 3 to 35% by weight, of a monohydric or polyhydric alcohol. For the purposes of the invention, monohydric or polyhydric alcohols are only those which have no amino groups in addition to one or more alcoholic hydroxyl groups. Alkanolamines are thus not considered to be monohydric or polyhydric alcohols. Suitable monohydric alcohols are, for example, $C_1$ to $C_5$ alkanols, such as methanol, ethanol, propanols, butanols and pentanols, preferably methanol. Methanol is particularly suitable for a low-temperature process (absorption at down to −70° C.). Suitable polyhydric alcohols are, for example, $C_2$–$C_8$ alkanediols, $C_3$–$C_{10}$ alkanetriols, $C_4$–$C_{12}$ alkanetetraols, $C_5$–$C_{16}$ alkanepentaols, $C_6$–$C_{20}$ alkanehexaols, for example ethylene glycol, propylene glycol, glycerol, butanediols, butanetriols, pentanediols, trimethylol-propane, neopentyl glycol, pentaerythritol, and oligomeric ethers of polyhydric alcohols, such as diethylene glycol and triethylene glycol, preferably diethylene glycol, or diglycerol and triglycerol, and in addition sugar alcohols.

Preferred polyhydric alcohols have a boiling point of >180° C. Preferred polyhydric alcohols are ethylene glycol, propylene glycol, 1,3-propanediol, glycerol, trimethylolpropane, neopentyl glycol, 1,2,4-butane-triol, 2,5-dimethyl-2,5-hexanediol, 1,4-butanediol, 2,3-butanediol, 1,2-pentanediol and 1,5-pentanediol.

Of the monohydric and polyhydric alcohols, in general, preference is given to the polyhydric alcohols, in particular preference is given to glycerol, 1,3-propanediol, neopentyl glycol and trimethylol-propane. Special preference is given to glycerol.

The liquid absorption medium comprises from 0 to 60% by weight of an aliphatic alkanolamine as component C. Suitable aliphatic alkanolamines are, for example, the aliphatic alkanolamines customarily used as chemical solvents for acidic gas constituents, such as diisopro-panolamine (DIPA), monoethanolamine (MEA), diethanolamine (DEA), triethanolamine (TEA), methyldi-ethanolamine (MDEA), monomethylethanolamine (MMEA), diethylethanolamine (DEEA), aminodiglycol (ADG) and 3-diethylamino-1,2-propanediol (DEAPD). Preference is given to MDEA.

As component D, the liquid absorption medium comprises from 0 to 98.9% by weight, preferably from 30 to 70% by weight, of water.

Furthermore, as a further chemical absorption medium, $K_2CO_3$ can be present as component E, preferably in amounts up to 35% by weight.

The liquid absorption medium can comprise other customary components such as defoamers, corrosion inhibitors and flocculation aids, preferably in amounts of from 0 to 5% by weight, particularly preferably from 0 to 1% by weight.

In one embodiment, the absorption medium of the invention comprises the components A, B and D and not the components C and E. In this case, the liquid absorption medium preferably consists only of the components A, B and D.

In a specially preferred variant of this embodiment, the liquid absorption medium consists of from 15 to 30% by weight of piperazine, from 3 to 35% by weight of glycerol, 1,3-propanediol, neopentyl glycol or trimethylolpropane and from 35 to 72% by weight of water.

In a further embodiment, the absorption medium of the invention comprises the components A, B, C and D and not the component E. In a specially preferred variant of this embodiment, the liquid absorption medium consists of from 8 to 20% by weight of piperazine, from 3 to 35% by weight of glycerol, from 20 to 50% by weight of MDEA and from 30 to 69% by weight of water.

The absorption medium of the invention has a number of advantages over the absorption media known from the prior art.

The absorption medium of the invention, when component A is used instead of component C, has a markedly higher loading capacity (equilibrium loading) with $CO_2$. Loading capacity is the absorption capacity of the absorption medium for the acidic gas constituent (here $CO_2$) in question. This is greater the more the absorption medium of the invention comprises component A instead of component C. At a comparable total amine content, the loading capacity of the absorption medium of the invention with $H_2S$ is also markedly higher than in an absorption medium of the prior art.

In addition to the solubilizing action of the aliphatic alkanolamine, the solubilizing action of the monohydric or polyhydric alcohol (component B) for the component A occurs. It has been found that the solubility of the component A in the absorption medium of the invention in the presence of a monohydric or polyhydric alcohol is generally markedly higher than the solubility of the component A in the presence of an aliphatic amine without use of said alcohols in an absorption medium of the prior art. As a result, the absorption media of the invention can comprise the component A in high concentrations, which causes a high loading capacity with $CO_2$ and/or $H_2S$. In addition, the solubility of the carbamate of the component A in the absorption medium of the invention is markedly higher than in a system which comprises the component C and water, but not the component B, as further components. This avoids problems due to precipitation of carbamates at high $CO_2$ concentrations.

The liquid absorption medium of the invention in addition has a markedly higher absorption rate of $CO_2$ and $H_2S$. The absorption rate of $CO_2$ is, at a constant molar total amine content, higher the more component A and the less component C are present in the liquid absorption medium of the invention. In the absorption media of the invention, particularly high contents of component A can be achieved. For example, in an absorption medium which comprises piperazine in a mixture of glycerol/water, the absorption rate of $CO_2$ is increased by up to a factor of 90 over an absorption medium which, at the same molar total amine content, comprises MDEA instead of piperazine. At a comparable total amine content, the absorption rate of the absorption medium of the invention for $H_2S$ is also markedly higher than in an absorption medium of the prior art.

The liquid absorption medium of the invention in addition has the advantage that the absorption rate Of $CO_2$ increases in an essentially linear manner with the content of component A, but the absorption rate of $H_2S$ for a defined content of component A can have a clear maximum. When this maximum is reached, the absorption rate of $H_2S$ can be above the absorption rate for $CO_2$, while it can be below the absorption rate of $CO_2$ for lower and higher piperazine contents. As a result, it is possible, by selecting the content of component A, to influence the selectivity of the absorption medium of the invention for the absorption of $CO_2$ or $H_2S$.

Further advantages are the decreased tendency toward, foam formation, the decreased corrosivity, the decreased volatility of piperazine and water, the lowering of the freezing and setting points and the cloud point of the absorption media of the invention.

The untreated gas rich in acidic gas constituents is brought into contact in one absorption step in an absorber with the absorption medium of the invention, as a result of which the acidic gas constituents are at least partially scrubbed out. Untreated gases rich in acidic gas constituents are, for example, the abovementioned gases which can comprise one or more of the acidic gas constituents within the specified limits. A scrubbing apparatus used in customary gas scrubbing processes preferably functions as absorber. Suitable scrubbing apparatus are, for example, dumped-packing towers, arranged-packing towers, plate towers, radial stream scrubbers, jet scrubbers, venturi scrubbers and rotary spray scrubbers, preferably arranged-packing towers, dumped-packing towers and plate towers, particularly preferably arranged-packing towers and dumped-packing towers.

The temperature of the absorption medium in the absorption step is generally from 40 to 100° C., when a tower is used, for example, from 40 to 70° C. at the top of the tower and from 50 to 100° C. at the bottom of the tower. The overall pressure in the absorption step is generally from 1 to 120 bar, preferably from 10 to 100 bar. The $CO_2$ partial pressure and the $H_2S$ partial pressure depend on the composition of the gas mixture, but are preferably up to 30 bar for $CO_2$ and up to 20 bar for $H_2S$. A clean gas low in acidic gas constituents, i.e. depleted in these constituents, and an absorption medium laden with acidic gas constituents are obtained.

In a preferred embodiment of the process of the invention, the absorption step is carried out in a plurality of sequential partial steps, the untreated gas comprising the acidic gas constituents being brought into contact in each of the partial steps in each case with a partial stream of the absorption medium. This can be achieved, for example, in such a manner that a partial stream of the absorption medium is fed at different points of the absorber, the temperature of the fed absorption medium preferably decreasing in sequential partial steps from the bottom to the top of the tower.

The acidic gas constituents can be released in one regeneration step from the absorption medium laden with the acidic gas constituents, a regenerated absorption medium being obtained. In the regeneration step, quite generally, the loading of the absorption medium is decreased. The resultant regenerated absorption medium is preferably then recycled to the absorption step.

Generally, the regeneration step comprises depressurization of the laden absorption medium from a high pressure, as prevails when the absorption step is carried out, to a lower pressure. The depressurization can take place, for example, using a throttle valve. Instead of, or in addition to, a throttle valve, an expansion turbine can be used, by which a generator can be driven and electrical energy produced, or the liquid pump of the solvent circuit can be driven.

The acidic gas constituents can be released in the regeneration step, for example, in an expansion tower, e.g. a vertically or horizontally installed flash vessel or a countercurrent tower having internals. A plurality of expansion towers can be connected in series, in which regeneration is performed at different pressures. For example, the regeneration can be carried out in a pre-expansion tower at high pressure, which is typically approximately 1.5 bar above the partial pressure of the acidic gas constituents in the absorption step, and at a low pressure, for example from 1 to 2 bar absolute, in a main expansion tower.

In a preferred embodiment, a stripping is carried out in the regeneration step, further acidic gas constituents being released from the absorption medium. The stripping can be carried out in a desorption tower equipped with dumped packings or arranged packings, in which desorption tower the stripping medium (stripper) is conducted in the opposite direction to the absorption medium. Preferably, the pressure during the stripping is from 1 to 3 bar absolute and the temperature is from 90 to 130° C., stripping being performed using hot gas or water vapor, preferably with steam.

It is an advantage of the process of the invention that, because of the higher absorption or desorption rate of the acidic gas constituents in the absorption medium of the invention, in particular of $CO_2$, absorption towers or desorption towers of considerably lower constructional height can be used. Because of the higher loading capacity and the reduced residual loading of the absorption medium of the invention with the acidic gas constituents, in particular with $CO_2$, the circulated amounts of the absorption medium used can be decreased.

In a preferred embodiment, the regeneration step is carried out in a plurality of sequential partial steps, the absorption medium obtained after sequential (in time) partial steps having a decreasing loading with acidic gas constituents. For example, from the laden absorption medium in an expansion tower, a first part of the acidic gas constituents can be released and then stripped, further acidic gas constituents being released and the absorption medium being substantially regenerated. Regeneration can also be carried out stepwise in a plurality of (series-connected) expansion towers, or in a plurality of expansion towers and additionally in a stripper. When use is made of a plurality of expansion towers, for example a pre-expansion tower and a main expansion tower, preferentially, inert gases are released in the first expansion tower (pre-expansion tower) and acidic gas constituents in the subsequent towers.

For example, as described in DE-A 25 51 717, a coarse scrubbing can be carried out using a pure expansion circuit (without stripping), the laden absorption medium being expanded via an expansion turbine and regenerated stepwise in a pre-expansion tower and a main expansion tower. The last-mentioned variant of the process of the invention is suitable in particular for gases which have high partial pressures of the acidic gas constituents to be scrubbed out and if only low requirements are made of the purity of the scrubbed gas (clean gas).

In a further preferred embodiment of the process of the invention, the partial streams of the absorption medium used in sequential partial steps of the absorption step are obtained after sequential partial steps of the regeneration step and have a decreasing loading with acidic gas constituents. Here, in particular, a process is preferred in which the untreated gas comprising the acidic gas constituents is brought into contact sequentially with a first partial stream of the absorption medium which is obtained after partial regeneration in an expansion tower and upstream of the stripping, and a second partial stream of the absorption medium which is obtained downstream of the stripping.

For example, as described in DE-A 25 51 717, the absorption step can be carried out in two partial steps, a coarse scrubbing and a fine scrubbing, and the regeneration step can be carried out stepwise by pressure expansion in an expansion turbine, a pre-expansion tower and a main expansion tower and a subsequent stripping, the partial stream for the coarse scrubbing originating from the main expansion tower and the partial stream of the absorption medium for the fine scrubbing originating from the stripping.

Figure 2:
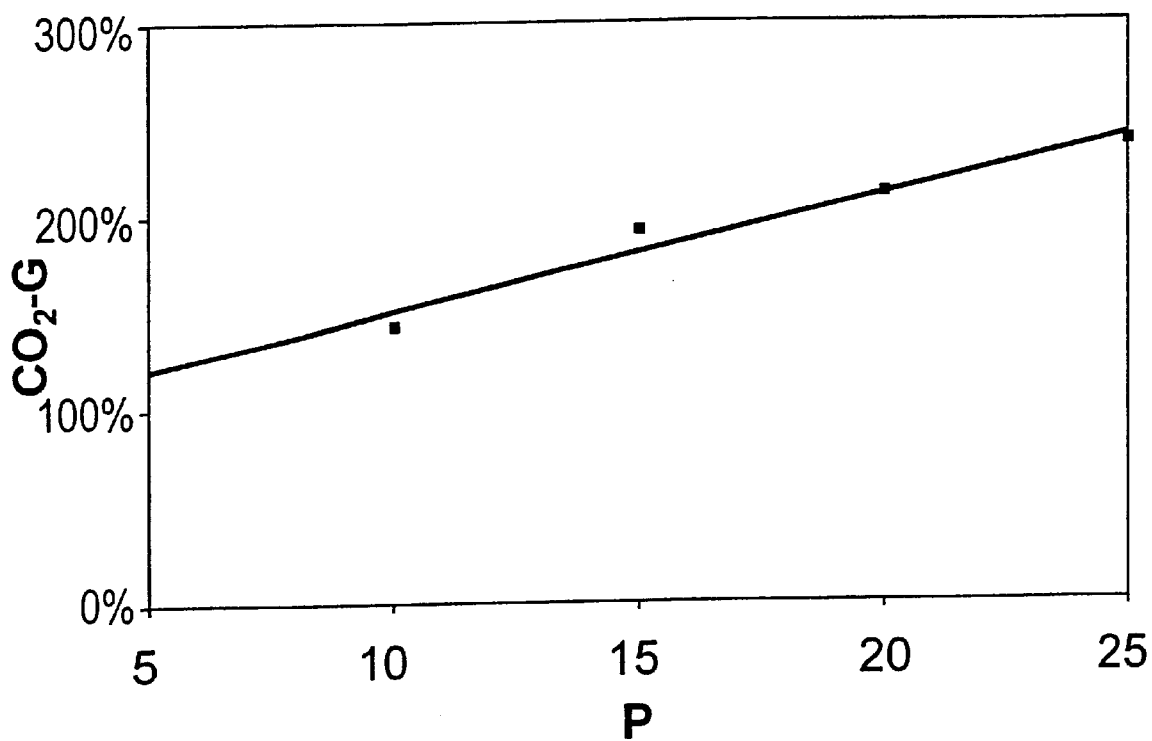
Figure 3:
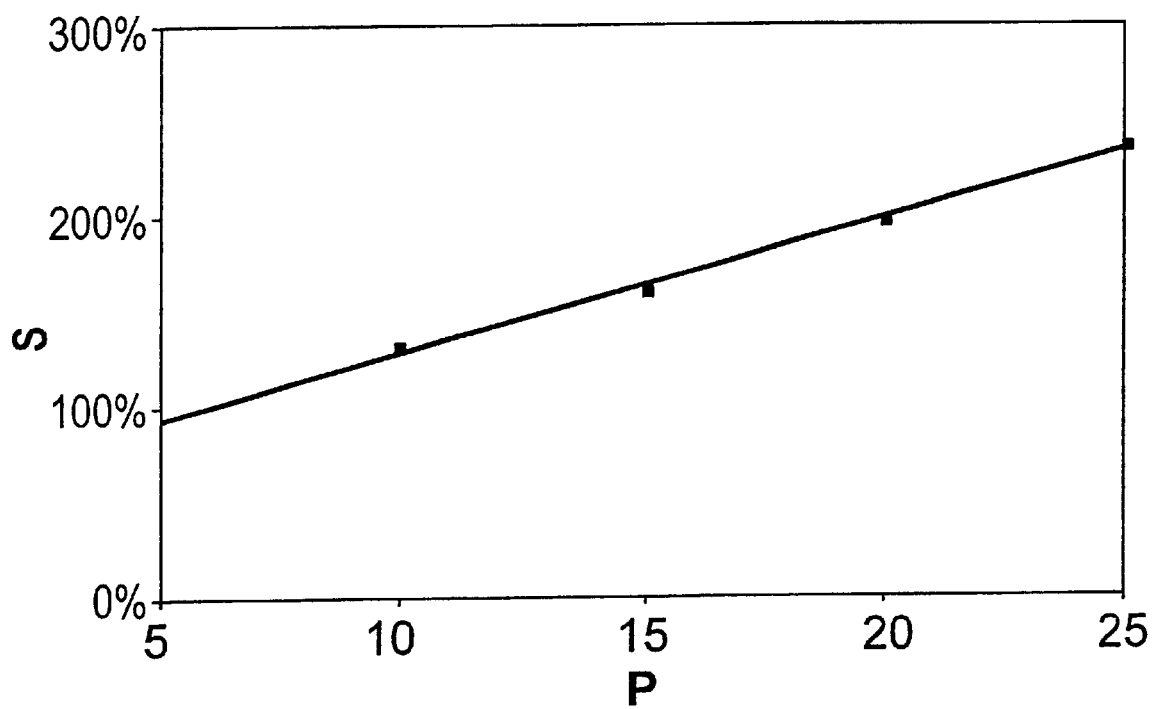
Figure 4:
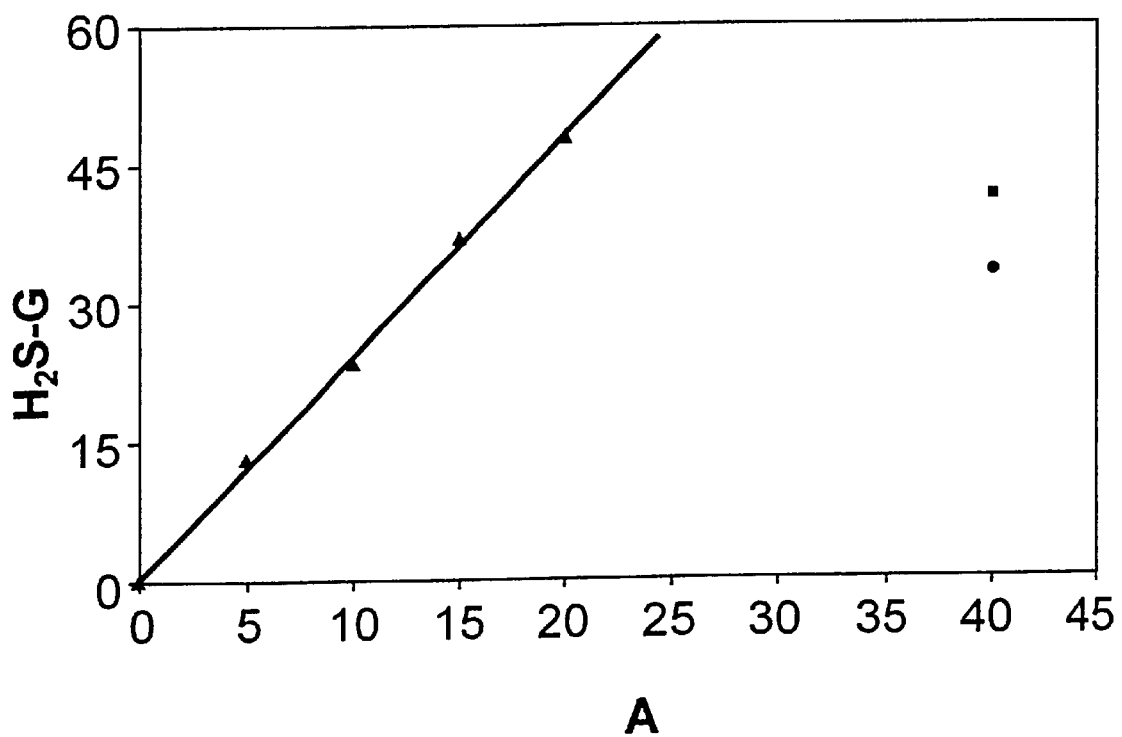
Figure 5:
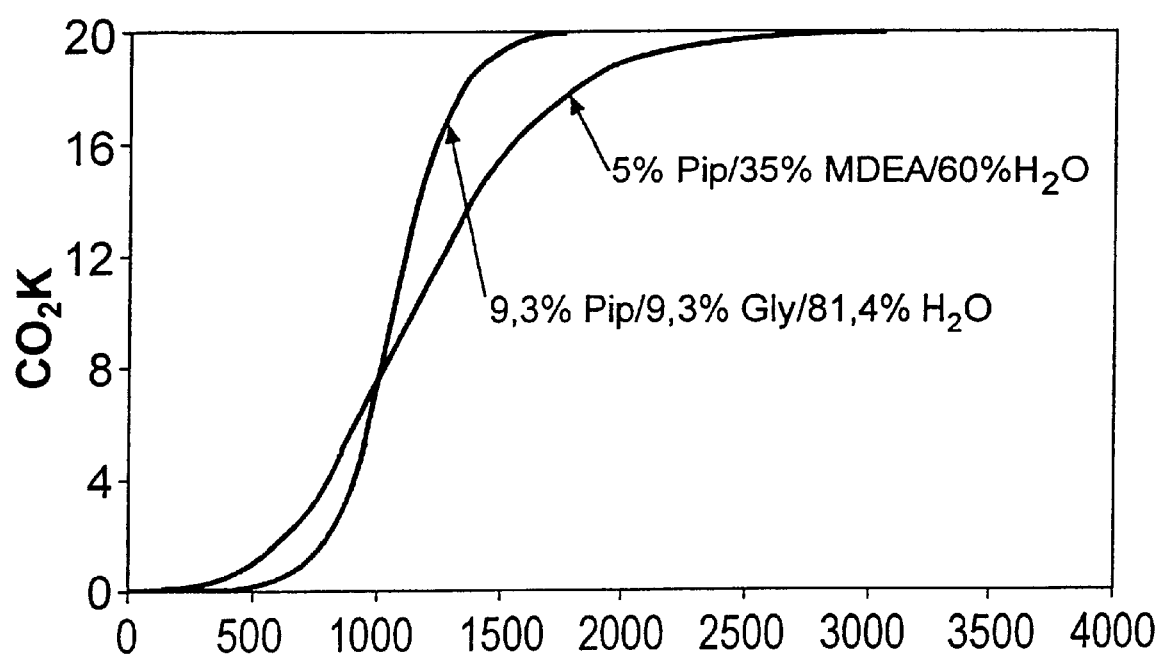
Figure 6:
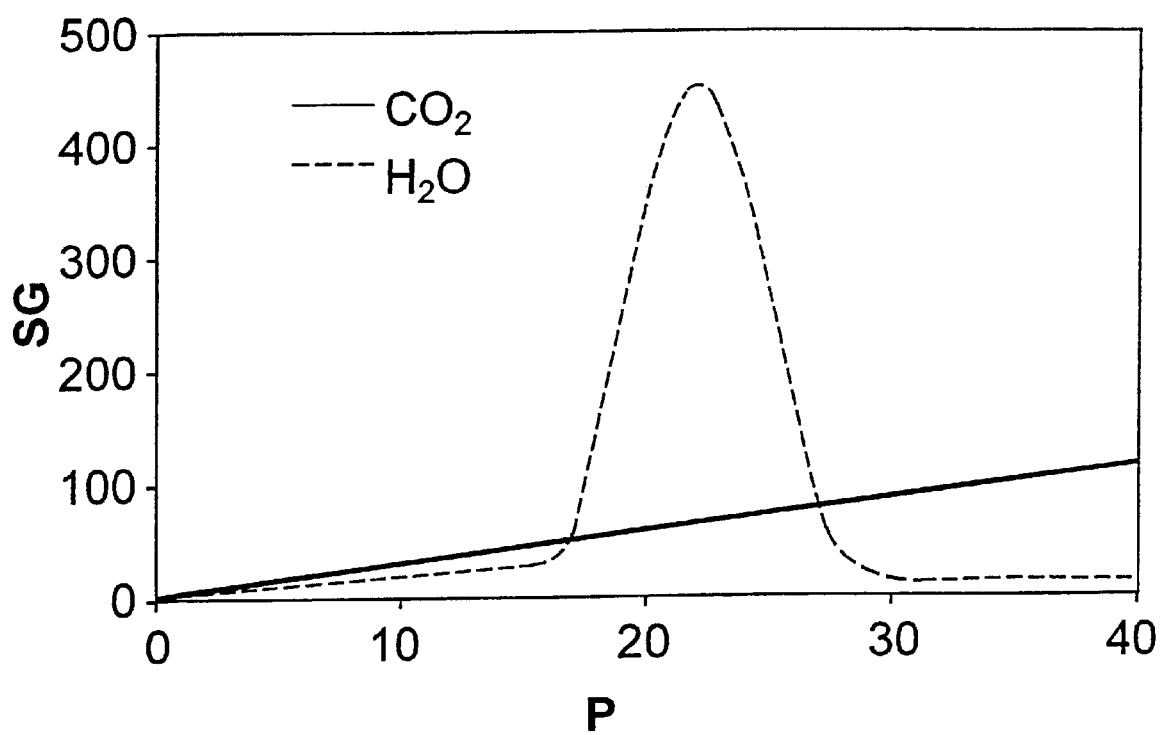
Figure 7:
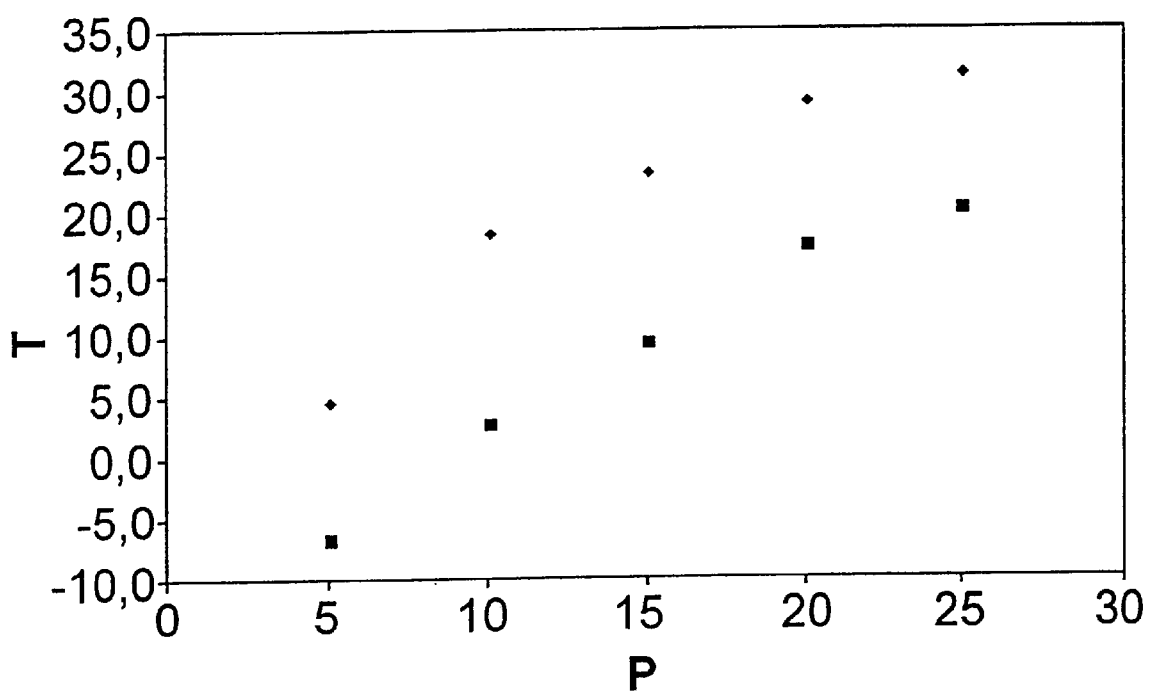

The invention is described in more detail below with reference to the exemplary embodiments illustrated in the drawing. In the drawing:

FIG. 1: shows a diagrammatic representation of a preferred embodiment of the process according to the invention;

FIG. 2: shows relative $CO_2$ equilibrium loadings which are obtained according to the invention relative to a comparative example;

FIG. 3: shows relative mass transfer rates of $CO_2$ which are obtained according to the invention relative to a comparative example;

FIG. 4: shows $H_2S$ equilibrium loadings which are obtained according to the invention and according to comparative examples;

FIG. 5: shows the absorption behavior of $CO_2$ which is obtained according to the invention and according to a comparative example;

FIG. 6: shows the mass transfer rates of $CO_2$ and $H_2S$ obtained according to the invention, and FIG. 7: shows solubility curves of piperazine which were found according to the invention and according to a comparative example.

FIG. 1 is a diagrammatic representation of a preferred embodiment of the process according to the invention. Via a feed line 1, an untreated gas rich in acidic gas constituents is brought into contact with the regenerated absorption medium, which is fed via the absorption medium line 5, in an absorber designated 3 overall. In this operation, a clean gas low in acidic gas constituents is produced via a waste gas line 7. Via an absorption medium line 9 and a throttle valve 11, the absorption medium laden with acidic gas constituents is fed to a desorption tower (expansion tower or stripper) designated 13 overall, in which desorption tower the absorption medium is regenerated with release of acidic gas constituents which leave the desorption tower via the waste-gas line 15. The regenerated absorption medium is then fed back to the absorption tower via a heat exchanger 19 using a pump 17.

FIG. 2 shows the relative $CO_2$ equilibrium loading ($CO_2$-G) in % of an absorption medium which comprises piperazine dissolved in a mixture of 60% by weight of glyercol and water in relation to the $CO_2$ equilibrium loading of a comparison absorption medium which comprises 5% by weight of piperazine, 35% by weight of MDEA and 60% by weight of water, as a function of the piperazine content (P) in % by weight. To measure the equilibrium loading, 100 ml of absorption medium were treated with water-vapor-presaturated $CO_2$ for a period of 6 hours at a gas volumetric flow rate of 10 liters (under standard conditions) per hour (l(STP)/h) in a thermostated fritted flask (250 ml) at 70° C. and 1 bar. The $CO_2$ concentration in the solution was then determined by analysis and the equilibrium loading calculated therefrom in liters (under standard conditions) of gas per kg of absorption medium (l(STP)/kg).

Above a piperazine content of approximately 10% by weight, the absorption medium of the invention had a markedly higher loading capacity with $CO_2$.

FIG. 3 shows the relative mass-transfer rate (S) in % of $CO_2$ in the above (FIG. 2) defined absorption media as a function of piperazine content (P). The mass-transfer rate was determined in a laminar jet chamber using water-vapor-saturated acidic gas at $P_{total}$=1 bar, T=70° C., jet diameter= 0.94 mm, jet length=1 to 8 cm, volumetric flow rate of the absorption medium=1.8 ml/s and is recorded in gas volumes in cubic meters (under standard conditions) per unit surface area of the absorption medium, pressure and time [$m^3$(STP)/ ($m^2 \times bar \times h$)].

Above a piperazine content of approximately 10% by weight, the absorption medium of the invention has a markedly higher mass-transfer rate for $CO_2$.

FIG. 4 shows the $H_2S$ equilibrium loading ($H_2S$-G) in % of an absorption medium which comprises piperazine dissolved in a mixture of glycerol and 60% by weight of water (triangles, according to the invention) in comparison to the $H_2S$ equilibrium loading of an absorption medium which comprises 40% by weight of MDEA in water (Comparative Example A, circle) and 37% by weight of MDEA and 3% by weight of piperazine in water (Comparative Example B, square), plotted against the total amine content (A) in % by weight. The $H_2S$ equilibrium loading was determined in a similar manner to that of $CO_2$. To achieve a comparable equilibrium loading, according to the invention a markedly lower total amine content is necessary.

FIG. 5 shows the absorption behavior of $CO_2$ in an absorption medium consisting of 9.3% by weight of piperazine, 9.3% by weight of glycerol and 81.4% by weight of water (according to the invention) in comparison with an absorption medium having an identical equilibrium loading and consisting of 5% by weight of piperazine, 35% by weight of MDEA and 60% by weight of water (comparative example).

The measurements were carried out as follows: in a thermostated fritted flask (250 ml), 100 ml of absorption medium were gas-treated at 1 bar and 70° C. during the absorption phase with 30 l(STP)/h of a water-vapor-saturated gas mixture of 20% by volume of $CO_2$ and 80% by volume of $N_2$ (untreated gas). The $CO_2$ concentration of the gas stream dried after the gas treatment (residual gas) was determined on line using a URAS-$CO_2$ analyzer.

The $CO_2$ concentration ($CO_2$-K) of the residual gas is shown in % by volume as a function of the gas-treatment time in sec. The solution is saturated, and thus the equilibrium loading reached, when the $CO_2$ concentration of the residual gas is equal to the $CO_2$ concentration of the untreated gas, that is 20% by volume. The equilibrium loading is achieved in the case of the absorption medium of the invention as soon as after 1800 seconds, but in the case of the comparative absorption medium, not until after 3200 seconds.

FIG. 6 diagrammatically shows the mass-transfer rate (SG) in $Nm^3/(cm^2 bar \cdot h)$ of $H_2S$ (dashed line) and $CO_2$ (continuous line) in an absorption medium which comprises piperazine dissolved in a mixture of glycerol and 60% by weight of water, as a function of the piperazine content (P) in % by weight. The mass-transfer rate of $CO_2$ and $H_2S$ was measured as described above for $CO_2$.

The mass-transfer rate of $H_2S$ has a clear maximum in the absorption medium of the invention, which transfer rate exceeds the mass-transfer rate of $CO_2$ in this region.

FIG. 7 shows the temperature (T) in ° C./concentration course [piperazine content (P) in % by weight] of the piperazine solubility in an aqueous solution which comprises 30% by weight of solubilizer. According to the invention, glycerol is used as solubilizer (squares), according to the comparative example, MDEA is used as solubilizer (lozenges).

The piperazine solubility was determined following ASTM method D 2386-67 (equivalent to DIN 51421), by cooling the appropriate solution with stirring using a low temperature gradient. The solubility temperature was determined by observing the first crystal precipitation, recognizable by the cloudiness of the solution.

It was found that in the absorption medium of the invention, at the same piperazine concentration, the solubility temperature is more than 10° C. below that of the comparative example.

We claim:

1. A process for removing acidic gas constituents, of the group consisting of $CO_2$, $H_2S$, COS, $CS_2$ and mercaptans, from gases, in which, in an absorption step, an untreated gas rich in acidic gas constituents is brought into contact with an absorption medium, as a result of which a clean gas low in acidic gas constituents and an absorption medium laden with acidic gas constituents are obtained, which process comprises using as absorption medium a mixture comprising a) from 0.1 to 50% by weight of one or more mono-cyclic or bicyclic nitrogen heterocycles which are unsubstituted and/or monosubstituted or polysubstituted on the carbon by OH, $C_1$–$C_3$ alkyl and/or $C_1$–$C_3$ hydroxyalkyl and which have from 5 to 14 ring atoms and 1 or 2 heterocyclically bound nitrogen atoms per ring as component A, b) from 1 to 60% by weight of a monohydric and/or polyhydric alcohol as component B, c) from 0 to 60% by weight of an aliphatic aminoalcohol as component C, d) from 0 to 98.9% by weight of water as component D, e) from 0 to 35% by weight of $K_2CO_3$ as component E, where the sum of components A, B, C, D and E is 100% by weight.

2. A process as claimed in claim 1, wherein the absorption medium as component A comprises piperazine which is unsubstituted and/or mono-substituted or polysubstituted on the carbon atom by OH, $C_1$–$C_3$ alkyl and/or $C_1$–$C_3$ hydroxyalkyl.

3. A process as claimed in claim 1, wherein the absorption medium as component A comprises unsubstituted piperazine.

4. A process as claimed in claim 1, wherein the liquid absorption medium comprises a polyhydric alcohol.

5. A process as claimed in claim 4, wherein glycerol, 1,3-propanediol, neopentyl glycol or trimethylol-propane is present as alcohol.

6. A process as claimed in one of claim 1, wherein the absorption medium consists of the components A, B and D.

7. A process as claimed in claim 1, wherein the absorption medium consists of the components A, B, C and D.

8. A process as claimed in claim 1, wherein the absorption step is carried out in a plurality of sequential partial steps, the untreated gas comprising the acidic gas constituents being brought into contact with a partial stream of the absorption medium in each case in each of the partial steps.

9. A process as claimed in claim 1, wherein a regeneration step is carried out in which the acidic gas constituents are released from the laden absorption medium, a regenerated absorption medium being obtained.

10. A process as claimed in claim 1, wherein the regenerated absorption medium is then recycled to the absorption step.

11. A process as claimed in claim 1, wherein a stripping is carried out in the regeneration step.

12. A process as claimed in claim 1, wherein the regeneration step is carried out in a plurality of partial steps which are sequential in time, the absorption medium obtained after partial steps which are sequential in time having a decreasing loading with acidic gas constituents.

13. A process as claimed in claim 12, wherein the partial streams used in sequential partial steps of the absorption step are obtained after sequential partial steps of the regeneration step and have a decreasing loading with acidic gas constituents.

14. An absorption medium which comprises a) from 0.1 to 50% by weight of one or more mono-cyclic or bicyclic nitrogen heterocycles which are unsubstituted and/or monosubstituted or polysubstituted on the carbon by OH, $C_1$–$C_3$ alkyl and/or $C_1$–$C_3$ hydroxyalkyl and which have from 5 to 14 ring atoms and 1 or 2 heterocyclically bound nitrogen atoms per ring as component A, b) from 1 to 60% by weight of a monohydric or polyhydric alcohol as component B, c) from 0 to 60% by weight of an aliphatic alkanolamine as component C, d) from 0 to 98.9% by weight of water as component D, e) from 0 to 35% by weight of $K_2CO_3$ as component E, where the sum of components A, B, C, D and E is 100% by weight.

15. A method of removing acidic gas constituents from gases using an absorption medium as defined in claim 14.

* * * * *